May 11, 1965     W. E. ELDRED     3,182,452
MOVABLE THRUST NOZZLE AND SEALING MEANS THEREFOR
Filed April 15, 1959     2 Sheets-Sheet 1

INVENTOR.
WENDELL E. ELDRED.
BY
AGENT

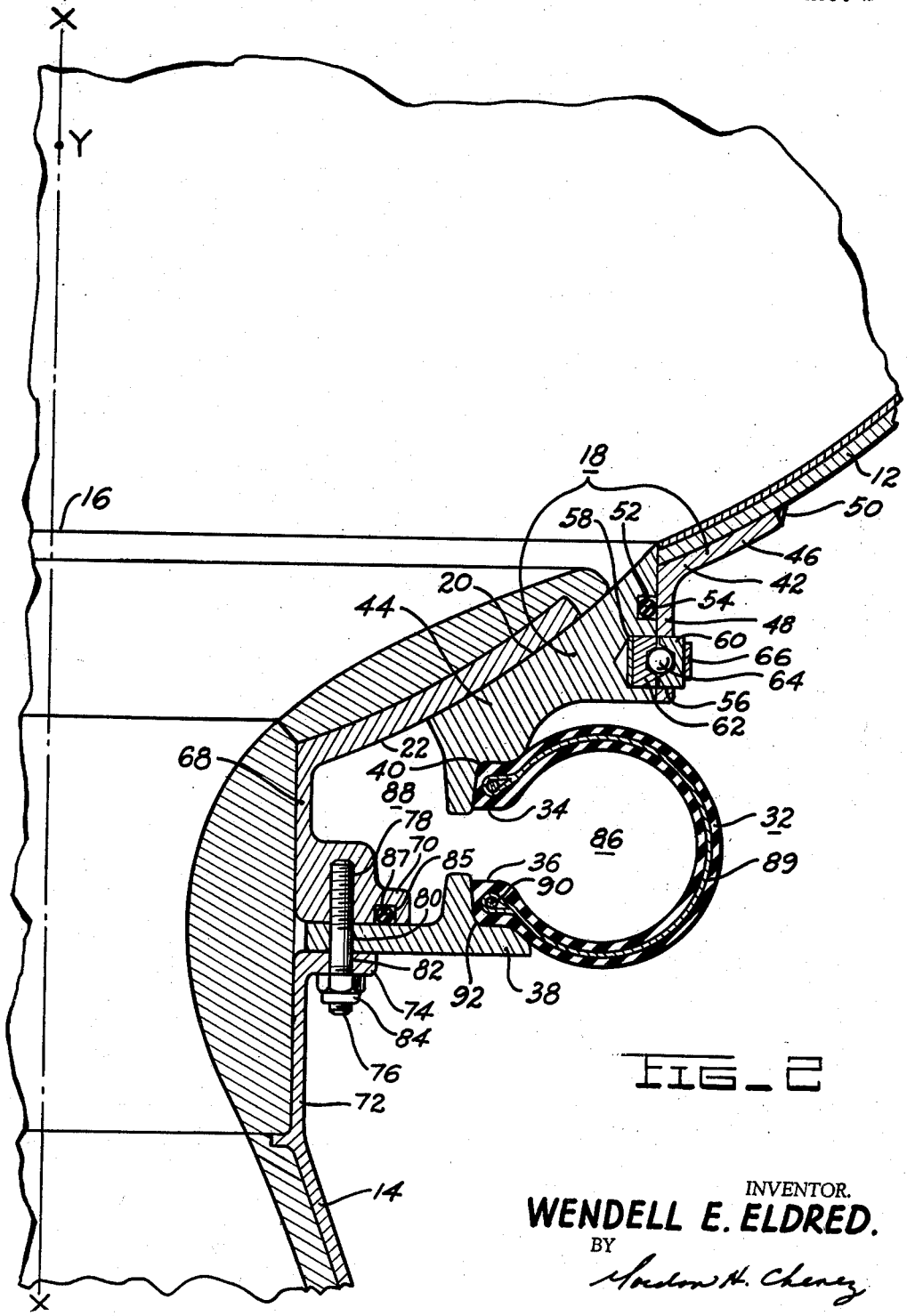

3,182,452
MOVABLE THRUST NOZZLE AND SEALING MEANS THEREFOR
Wendell E. Eldred, South Bend, Ind., assignor to The Bendix Corporation, a corporation of Delaware
Filed Apr. 15, 1959, Ser. No. 806,505
10 Claims. (Cl. 60—35.55)

This invention relates to a movable thrust nozzle for varying the thrust vector of a jet propelled vehicle.

One known method of controlling the line of flight of a thrust producing vehicle such as a rocket missile or the like is to vary the position of the thrust nozzle angularly relative to the longitudinal axis of the vehicle so as to develop a radial or side component of thrust which, in turn, has a steering effect on the vehicle.

Other known methods of steering a rocket missile or the like include various arrangements of movable vanes or other fluid deflecting surfaces which are disposed in the path of the exhaust gases and which through suitable control apparatus are actuated as a function of a suitable parameter of operation to cause a corresponding deflection of the exhaust gases which, in turn, has a steering effect on the missile.

In the past, the above mentioned movable thrust nozzles as well as the movable vane arrangement have been objectionable in that they have generally required bulky and weighty apparatus which, in addition to being unwieldy during operation, also tend to reduce rocket efficiency.

Heretofore, the movable thrust nozzles have not been entirely satisfactory in operation due to the lack of efficient sealing means for preventing the flow of hot motive gases between the relatively movable surfaces of the movable nozzle and the portion of the vehicle supporting the movable nozzle. During the combustion process, a relatively high pressure drop will exist across the thrust nozzle as well as any flow path such as that established by the mating surfaces of the movable nozzle and vehicle casing. It is essential that the flow of hot motive gases through any flow path other than the movable thrust nozzle be reduced to zero to eliminate unnecessary pressure loss and, even more important, to prevent rapid erosive nozzle burnout caused by leakage of the hot motive gases. In the past, various kinds of seals have been proposed to prevent or minimize the leakage of hot motive gases between the mating surfaces of a movable nozzle and the adjacent portion of the vehicle which supports the nozzle but none of these seals have proved to be entirely successful for one reason or another. One such method has been to provide a relatively close sliding fit between the relatively movable surfaces of the thrust nozzle and the vehicle casing such that the flow of gases therebetween is reduced to a minimum. However, even with a relatively small flow of gases between the mating surfaces, these surfaces are subject to rapid erosion and subsequent deterioration and within a fairly short time tend to bind against one another such that the force required to move the nozzle in any given direction becomes prohibitive. As a result, the movable nozzle may become fixed in a position with subsequent loss of guidance control.

Also, various attempts have been made to provide one or more wiper seals on one or both of the mating surfaces, which seals extend into sliding engagement with the opposite surface to block the flow of gases therebetween. Unfortunately, the wiper seals deteriorate rather rapidly due to frictional wear and the high temperature, high pressure gases impinging thereagainst. Within a relatively short time the wiper seals cease to function efficiently and permit more gas to escape past the seals which, in turn, increases the rate of deterioration and corrosion of the seals as well as the relatively movable surfaces of the nozzle and vehicle.

It is, therefore, an object of this invention to provide a relatively simple and effective movable thrust nozzle for a jet propelled vehicle.

It is an object of this invention to provide a flexible annular seal which is pressurized by a flow of pressurized gas to establish a substantially inert gas volume.

It is another object of this invention to provide a movable thrust nozzle for controlling the line of flight of a jet propelled vehicle.

It is still another object of this invention to provide a movable thrust nozzle and effective sealing means therefor for a jet propelled vehicle.

An important object of this invention is to provide a relatively lightweight and compact movable thrust nozzle for a jet propelled vehicle.

Additional objects and advantages of the present invention will become apparent from the following description taken in conjunction with the accompanying drawings wherein:

FIGURE 2 is an enlarged quarter-sectional view of the present invention taken on the longitudinal axis of the rocket missile of FIGURE 1.

Figure 1:
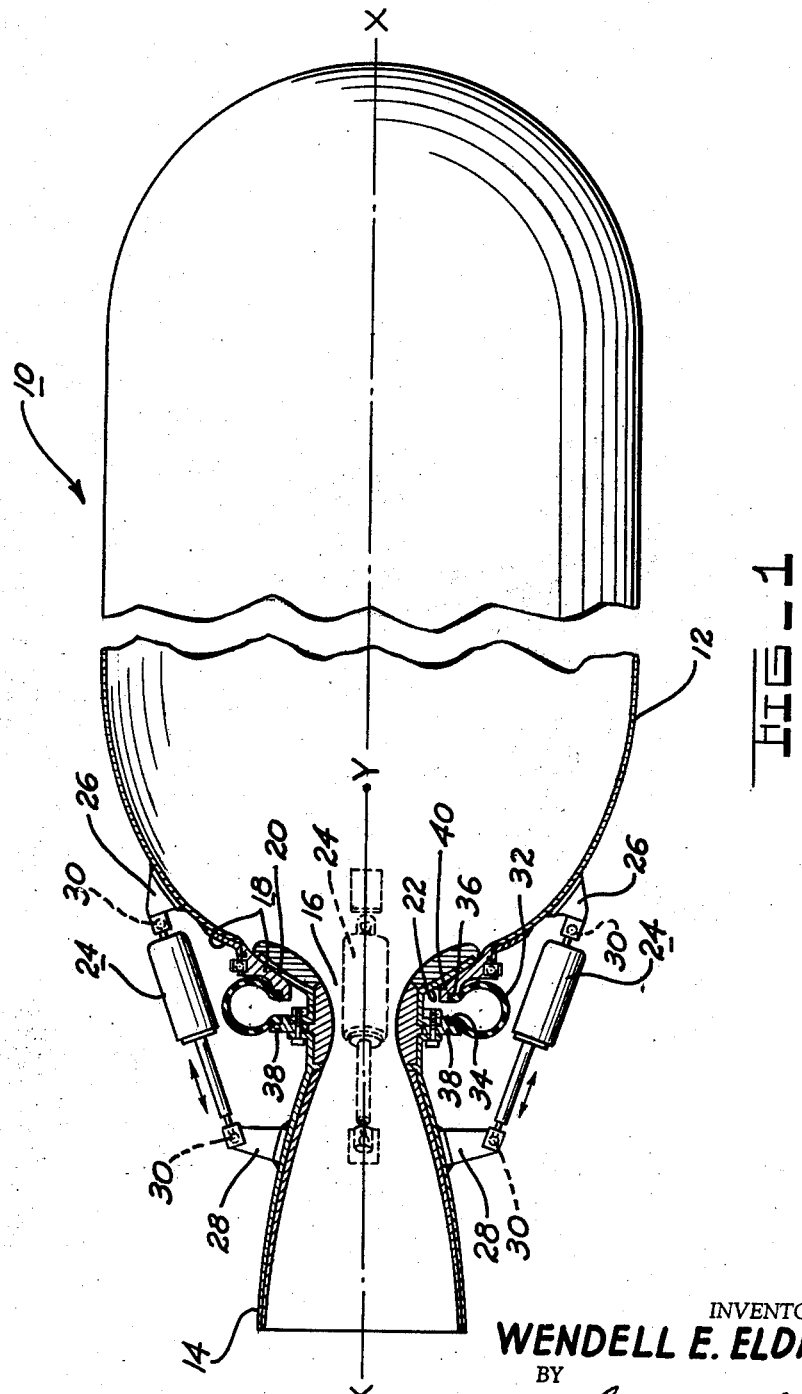
FIGURE 1 is a schematic representation of a rocket missile embodying the present invention.

Referring to FIGURE 1, numeral 10 designates a rocket missile having a casing 12 of generally circular form in which either liquid or solid fuel, not shown, is stored forward of a converging-diverging thrust nozzle 14. The combustion process occurs within the casing 12 in a conventional manner well understood by those skilled in the art and the resulting high pressure, high temperature gases expand through the thrust nozzle 14 to the atmosphere thereby generating thrust which propels the missile. The temperature and pressure of the gases during the combustion process reach relatively high values which, for example, may be on the order of 5000° F. and 500 p.s.i.a., respectively.

The casing 12 is provided with a rearwardly directed opening 16 which, in the embodiment shown in FIGURE 1, is centered on the longitudinal axis X—X of the casing although it will be understood that a plurality of such openings may be provided if more than one thrust nozzle is required, in which case the openings would be circumferentially arranged about the longitudinal axis of the casing 12. An annular support member 18 is fixedly secured to the outer surface of the casing 12 adjacent the opening 16 and is provided with a concave bearing surface 20, the center of curvature of which lies at Y on the longitudinal axis X—X. The thrust nozzle 14 extends through the annular support member 18 and is provided with a convex bearing surface 22 which slidably engages the bearing surface 20 and which also has its center of curvature at Y on the longitudinal axis X—X. Thus, the thrust nozzle 14 may be pivoted through a limited arc about point Y by means of the two bearing surfaces 20 and 22 which cooperate in the manner of a conventional ball and socket arrangement. A pair of diametrically opposed actuators 24 which may be of any conventional fluid pressure or electrically operated type are connected between support arms 26 and 28 fixedly secured to the external surfaces of casing 12 and thrust nozzle 14, respectively. Another pair of diametrically opposed actuators 24, one of which is visible in dotted outline, is arranged at right angles to the first mentioned pair of actuators 24 and connected between corresponding support arms 26 and 28. Thus the four actuators 24 are arranged 90° apart circumferentially about the thrust nozzle 14. Opposite ends of the actuators 24 are connected to their respective support arms 26 and 28 by means of a conventional ball and socket connection 30 which provides for universal movement of the actuators 24 relative to the support arms 26 and 28. An annular flexible sealing member 32 encircles the thrust nozzle 14 adjacent the throat portion of the nozzle and is provided with relatively movable bead portions 34 and 36 which engage a flanged member 38 carried by the thrust nozzle 14 and a flanged portion 40 of the support member 18, respectively. By coordinating the energization of the various actuators 24, the thrust nozzle 14 may be pivoted about point Y so as to follow a straight path in any plane containing the longitudinal axis X—X or an arcuate path between any two planes containing said axis within the range of movement of the nozzle. Such operation of the actuators 24 is conventional and will be readily understood by those persons skilled in the art of actuating mechanisms. Normally the angular displacement of the thrust nozzle 14 and thus the thrust vector of the gases flowing therethrough does not have to exceed approximately 10° in any direction from the longitudinal axis X—X to attain the desired range of steering control over the missile. The control apparatus, not shown, which supplies the control signal to the actuators 24 to cause actuation of the thrust nozzle 14 does not form any part of the present invention since such control apparatus is conventional and the use thereof in conjunction with applicant's thrust nozzle is considered within the skill of a person having an understanding of the art.

Now, referring to FIGURE 2 which is an enlarged quarter-sectional view of the thrust nozzle 14 and sealing member 32 the structural details thereof will be more fully described. The annular support member 18 is formed of two annular members 42 and 44. The member 42 has a radially outwardly extending flange 46 which engages the outer surface of the casing 12 adjacent the opening 16 and an axially extended annular flange 48 which forms a tubular extension of the opening 16. The flange 46 is fixedly secured to the casing 12 by any suitable means such as the continuous weld 50 which forms an airtight seal between the casing 12 and flange 46. The annular member 44 is concentrically located within the flange 46 and is provided with an outer circumferential surface which bears against the inner circumferential surface of the flange 48. An annular recess 52 formed in the annular member 44 is adapted to receive an annular sealing ring 54 which seals the gap between the two adjacent surfaces.

The annular members 42 and 44 are provided with a plurality of circumferentially arranged spaced circular openings 56 and 58, respectively. The openings 56 and 58 are axially aligned and slidably receive plugs 60 and 62, respectively. A steel ball 64 is clamped between spherical seats formed in the plugs 60 and 62. The depth of the seat in plug 62 is slightly less than the radius of the ball 64 and the depth of the seat in plug 60 is slightly more than the radius of the ball 64 such that, when assembled as shown in FIGURE 2, the centerline of the ball 64 is located radially outwardly from the line of intersection of the mating surfaces of the annular members 42 and 44. The ball 64 is clamped in position between the plugs 60 and 62 by means of a resilient metal strap 66 which encircles the flange 48 and tightly engages the outer ends of the plugs 60. Thus, the annular member 44 is held in position relative to the annular member 42 by the shear resistance of the balls 64. The thrust nozzle 14 may be jettisoned to terminate thrust by means of conventional release mechanism, not shown, which, in response to a control signal, breaks the strap 66 whereupon the steel balls 64 and plugs 60 are forced outwardly through the openings 56. The thrust nozzle is then jettisoned by the high pressure gases upstream from the nozzle 14 which force the thrust nozzle 14 rearwardly. The resulting rapid drop in combustion chamber pressure causes combustion chamber flame-out and subsequent thrust termination.

The thrust nozzle 14 is provided with a forward section 68 which includes the convex bearing surface 22 and an outwardly extending flanged portion 70 and a rear section 72 which includes the diverging portion of the nozzle and an outwardly extending flanged portion 74. The annular flanged member 38 is clamped between the flanged portions 70 and 74 by means of a plurality of studs 76 which are threadedly engaged in a plurality of spaced openings 78 circumferentially arranged in the flanged portion 70 and which extend therefrom through openings 80 and 82 in the flanged member 38 and the flanged portion 74, respectively, into engagement with lock nuts 84 which are tightened to draw the members into operating engagement. An annular recess 85 formed in the flanged portion 70 is provided with an annular seal 87 which engages the flanged member 38 to provide an effective seal therebetween. The throat portion of the thrust nozzle 14 is formed by molding to the inner surface of the thrust nozzle 14 any suitable material such as a refractory ceramic material or other material capable of withstanding the high temperature and corrosive effects of the gases flowing through the thrust nozzle 14. The inner converging and diverging portions of the thrust nozzle are formed by applying to the inner surface of the thrust nozzle a layer of suitable ablating material.

The annular sealing member 32 is made from any suitable flexible material such as rubber or, if extended heat resistance is desired, any of the known rubber compounds, such as silicone rubber. The rubber is reinforced by one or more plys 89 of organic material such as nylon, rayon, etc. which in the preferred embodiment are formed by strands or fibers of nylon, rayon, or other suitably material arranged crosswise to the seal 32 i.e., disposed from one bead to the other bead across the width of the seal 32. The strands or fibers are arranged in spaced apart relationship and adjacent strands do not overlap one another. Arranging the strands in this manner will avoid localized distortion of the seal as it is deformed which, in turn, reduces internal abrasion and/or stress concentrations and subsequent early failure of the seal 32. Flexible steel wires of relatively small diameter may be used in place of the strands of organic material to increase the strength of the seal 32 as desired. The sealing member 32 is of generally circular form and the walls thereof define an annular U-shaped chamber 86 which opens inwardly toward the thrust nozzle 14 into communication with a chamber 88 formed by the annular member 44, the forward section 68 of the thrust nozzle 14 and the flanged member 38. The walls of the sealing member 32 terminate in oppositely disposed bead portions 34 and 36 each of which have a wire or cable 90 imbedded therein to provide added rigidity thereto. The bead portions 34 and 36 engage rim-like flanges 40 and 92 on member 44 and flanged member 38, respectively. The members 44 and 38 may be made from a metal or other suitable material having a low thermal conductivity to minimize the propagation of heat between the surfaces adjacent the hot motive gases and the sealing member 32.

The combustion process in casing 12 is started in a conventional manner through conventional ignition apparatus, not shown. The resulting high pressure, high temperature gases expand through the thrust nozzle 14 to the atmosphere to generate propelling thrust. Initially, air at atmospheric pressure exists in chambers 86 and 88 such that a relatively high pressure drop will exist across the mating bearing surfaces 20 and 22 as soon as the combustion process takes place. The high pressure, high temperature gases upstream from the thrust nozzle 14 will tend to leak past the mating bearing surfaces 20 and 22 into the chamber 88 then into the chamber 86 where the high pressure gases cause the sealing member 32 to expand thus forcing the bead portions outwardly into sealed engagement with the flanges 40 and 92, respectively. Within a relatively short time, the pressure in chambers 86 and 88 will stabilize to the pressure of the gases upstream from the thrust nozzle 14. Thus, the sealing member 32 provides an effective barrier between chamber 86 and the atmosphere through which the high pressure gases are unable to flow. The high temperature gases in chambers 86 and 88 will be cooled to a considerable extent by virtue of the large temperature differential between the gases on the one side of the sealing member 32 and the colder air of the atmosphere on the opposite side of the sealing member 32 which promotes a transfer of heat through the sealing member 32. Since the flow of gases between the combustion chamber and the chambers 86 and 88 is negligible subsequent to stabilization of the pressure in said chambers, the cooled gases trapped in chambers 86 and 88 form an insulating barrier adjacent the inner surface of the sealing member 32 which minimizes the deterioration of the sealing member 32 and prolongs the useful life thereof.

The high pressure gases in casing 12 act against the converging portion 68 of the thrust nozzle 14 to produce an axially directed force which urges the thrust nozzle rearwardly thereby maintaining bearing surface 20 in contact with bearing surface 22. Movement of the thrust nozzle 14 about point Y is achieved by energizing the actuators 24 in a coordinated manner in accordance with the desired direction of movement and the desired angular displacement of the thrust nozzle 14. As the thrust nozzle 14 is displaced, the bead portion 36 of the sealing member 32 is displaced relative to the bead portion 34 which results in deformation of the flexible sealing member 32. It will be understood that the sealing member 32 is sufficiently flexible to allow it to deform to a considerable extent in accordance with full range movement of the thrust nozzle 14 without disturbing the seal established between the bead portions 34 and 36 and their respective flange members. It will be noted that deformation of the sealing member 32 does not create appreciable frictional resistance as is the case in the heretofore mentioned prior art sliding seals. Thus, the relatively inconsistent frictional resistance associated with sliding seals which must be taken into consideration when determining the actuating force required to move the thrust nozzle is eliminated by means of the sealing member 32.

While a specific embodiment of the present invention has been shown and described, it will be apparent to those skilled in the art that various alterations and modifications may be made without departing from the scope of the appended claims.

I claim:

1. In combination with a jet propelled vehicle having a casing with a longitudinal axis and provided with a combustion chamber and a rearwardly directed opening through which hot motive gases are expelled during the combustion process, a thrust nozzle having an annular bearing surface forming a mounting for said nozzle which is adapted for movement in said opening to control the line of action of the gases flowing therethrough, means operatively connected to said thrust nozzle for actuating said thrust nozzle to effect angular displacement of said thrust nozzle relative to said axis, an annular flexible elastomeric enclosure having sealing edges along its inner diameter which are spread apart to provide access to the interior of said enclosure, an annular flanged member fixedly secured to said casing, and an annular flanged member fixedly secured to said nozzle, the spread apart sealing edges of said annular flexible seal in abutting relationship with said flanged members and defining a sealed enclosure surrounding the bearing surface between said nozzle and casing and open to the ingress of gases leaking past said bearing surface which is terminated as a flow within said flexible enclosure, said flexible seal being deformable in accordance with universal pivotal actuation of said thrust nozzle.

2. In combination with a jet propelled vehicle having a casing provided with a combustion chamber and a rearwardly directed opening through which hot motive gases at high pressure are expelled during the combustion process, a thrust nozzle in said opening for controlling the line of action of said gases which flow therethrough to atmosphere, means forming a longitudinal thrust bearing between said thrust nozzle and casing and coupling them together while providing angular movement of said thrust nozzle relatively to the longitudinal axis of said vehicle, controllable means operatively connected to said thrust nozzle for actuating said thrust nozzle as a function of a variable control signal, said bearing means including an annular supporting member fixedly secured to said casing and providing a curved bearing sruface on its inner portion, a curved bearing surface also a part of said bearing means and which is formed on an outer portion of said thrust nozzle, said curved bearing surfaces being slidably engageable and forming a narrow flow path through which motive gases are leaked, a flexible annular sealing member including sealing beads and having a doubled-over cross section which defines an annular chamber opening into fluid communciation with said flow path, one of the sealing beads of said sealing member engaging said supporting member and the other sealing bead of said sealing member engaging said pivotally mounted nozzle whereby movement of said nozzle effects flexing movement of the sealing member and the inflation pressure within said sealing member from the leakage of said gases urges the beads of said sealing member into gastight engagement with its supporting members, and thereby providing an effective fluid seal between said flow path and the atmosphere.

3. In combination with a jet propelled vehicle having a casing provided with a combustion chamber and a rearwardly directed opening through which hot motive gases at high pressure are expelled to the atmosphere to generate thrust for propelling the vehicle, fixed means defining an annular bearing surface of curvilinear cross section, a thrust nozzle disposed in said opening in axial alignment therewith for controlling the line of action of said gases relative to the longitudinal axis of said casing, an annular bearing surface of curvilinear cross section formed on said thrust nozzle which is complementary with and slidably engages said first named curved bearing surface and is movable relative thereto, said bearing surfaces forming therebetween a leakage path through which the high pressure gases upstream from the thrust nozzle can flow along said leakage paths in a direction to atmosphere, actuating means operatively connected to said thrust nozzle for moving the same about a point on the longitudinal axis of said casing, and an annular flexible sealing member having a folded cross section in fluid communication with the downstream leakage flow of said gases, said annular sealing member having sidewalls which terminate in first and second sealing beads, said first and second sealing beads in air-tight engagement to and held with their sealing beads apart to receive said leakage flow of gases therebetween, one of said beads being movable with the thrust nozzle and the other of said beads being held against such angular movement by said casing, said annular flexible sealing member being thereby positioned to define an annular sealing chamber which confines the leakage flow of gases to obtain a static dead end chamber, which prevents leakage flow of gases from said flow path to the atmosphere regardless of the position of said thrust nozzle within its range of movement.

4. In combination with a jet propelled vehicle having a casing provided with a combustion chamber and at least one rearwardly directed movable thrust nozzle through which hot motive gases at relatively high temperature and pressure are expelled from the combustion chamber to the atmosphere to generate a propelling thrust, means operatively connecting said thrust nozzle to said casing and including first and second relatively movable bearing means which transmit axial thrust force therebetween and provide restricted leakage flow of gases in a direction leading to atmosphere, means operatively connected to said movable thrust nozzle for actuating the same, and an annular elastomeric flexible sealing member circumferentially arranged about said movable thrust nozzle and provided with first and second radial walls which terminate in first and second circular sealing surfaces, said first and second sealing surfaces having sealed connections with said casing and movable thrust nozzle and exposed to pressure effecting tighter sealing engagement therewith to thereby establish a deformable seal between said thrust nozzle and said casing and defining a dead air space surrounding said leakage path.

5. In a jet propelled vehicle having a casing and angularly movable nozzle at the end of the casing provided with a through passage for movement of hot motive gases therethrough, an annular flexible sealing member having two sealing edges, one operatively connected with said casing and the other with said movable nozzle and exposed to pressure urging said edges into further sealing relation with said casing and nozzle and defining a dead air space closed chamber, means forming a limited flow path for diverting a portion of the main stream of the hot motive gas from said casing to within said closed chamber to provide a substantially dead flow or static gas volume at pressures proportional to a prevailing pressure in said casing which defines a sealed chamber surrounding said casing and movable nozzle and providing a seal therebetween.

6. In a jet propelled vehicle having a casing including a charge of combustible material for generating hot motive gas, and angularly movable nozzle operatively secured at one end of said casing having a limited leakage path formed between said casing and said nozzle, a flexible annular sealing member having an annular opening along its inner surface providing two relatively movable sealing beads, means for securing one of said sealing beads to said casing and the other of said sealing lips to said angularly movable nozzle and providing support surfaces against which said beads are urged by pressure derived from the interior of said casing such that said flexible annular sealing member forms a dead air space barring further leakage flow through said access path.

7. The structure of claim 6 including means for reinforcing at least a portion of said resilient annular member at its annular bead portions to resist distortion thereof under the pressure of the gas confined within said sealing members.

8. In combination with a jet propelled vehicle having a casing provided with a combustion chamber and a rearwardly directed opening through which hot motive gases are expelled during the combustion process, a thrust nozzle, means for pivotally mounting said nozzle in said opening for controlling the line of action of the gases flowing therethrough, said pivotal nozzle and said casing together defining two relatively movable surfaces which form a flow path through which said hot motive gases escape from said combustion chamber to the atmosphere, annular flexible sealing means having an annular opening at the inner diameter portion thereof with two sealing beads at the opposite sides of said opening which are in abutting relationship to engage said pivotal nozzle and said casing for preventing gas flow through said flow path to the atmosphere, said annular flexible sealing means defining a deformable chamber providing universal swiveling movement between said nozzle and casing and which opens into communication with said flow path to be pressurized by said hot motive gases which are obstructed by the dead air space defined within said flexible sealing means.

9. In a process for sealing a jet nozzle connection between a casing having an outlet and a nozzle mounted for relative angular movement in said outlet, the steps of discharging a main flow of hot motive gases through a path defined by the nozzle to generate propelling thrust, capturing any leakage about the jet nozzle connection in a chamber formed by an annular resilient seal having separate bead portions and an inner portion vented to said leakage, and attaching one lip portion of said annular resilient seal to the casing and the other lip portion to the relatively movable nozzle to create a dead air space in said chamber, which dead air space protects said seal from the high temperature flow in said nozzle.

10. The process of claim 9 including the step of controllably moving said nozzle to direct the line of movement of the rocket and thereby effecting flexible distortion of said seal while maintaining the charge of gases in a substantially inert condition.

References Cited by the Examiner

UNITED STATES PATENTS

| | | | |
|---|---|---|---|
| 2,465,373 | 3/49 | Hall | 285—263 X |
| 2,613,087 | 10/52 | Alford | 285—261 |
| 2,616,728 | 11/52 | Pitt | 285—261 X |
| 2,762,584 | 9/56 | Price. | |
| 2,766,581 | 10/56 | Welsh | 60—35.6 |
| 2,798,743 | 7/57 | Olesten | 285—229 X |
| 2,880,576 | 4/59 | Kappus | 60—35.6 |

FOREIGN PATENTS

| | | |
|---|---|---|
| 567,048 | 12/53 | Canada. |
| 697,721 | 9/53 | Great Britain. |

SAMUEL LEVINE, *Primary Examiner.*

JULIUS E. WEST, SAMUEL BOYD, ARTHUR M. HORTON, SAMUEL FEINBERG, *Examiners.*